US 10,243,474 B2

(12) United States Patent
Luccato et al.

(10) Patent No.: US 10,243,474 B2
(45) Date of Patent: Mar. 26, 2019

(54) ELECTRONIC CONVERTER AND RELATED METHOD OF OPERATING AN ELECTRONIC CONVERTER

(71) Applicant: OSRAM GmbH, Munich (DE)

(72) Inventors: Daniele Luccato, Vittorio Veneto (IT); Giancarlo Pellizzari, Resana (IT)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 15/973,605

(22) Filed: May 8, 2018

(65) Prior Publication Data
US 2018/0331629 A1 Nov. 15, 2018

(30) Foreign Application Priority Data
May 9, 2017 (IT) .................. 102017000050228

(51) Int. Cl.
H05B 41/24 (2006.01)
H02M 3/335 (2006.01)
(Continued)

(52) U.S. Cl.
CPC ..... *H02M 3/33576* (2013.01); *H02M 1/4266* (2013.01); *H02M 3/3376* (2013.01); *H05B 33/083* (2013.01); *H05B 33/0815* (2013.01)

(58) Field of Classification Search
CPC ...... H01R 33/94; H05B 39/06; H05B 1/2827; H05B 41/2828; H05B 41/295;
(Continued)

(56) References Cited

U.S. PATENT DOCUMENTS 5,994,848 A * 11/1999 Janczak ............. H05B 41/2856
315/224
2017/0048937 A1* 2/2017 Wang ..................... H01F 38/14

FOREIGN PATENT DOCUMENTS

EP 2395646 A1 12/2011
JP 2001224172 A 8/2001
(Continued)

OTHER PUBLICATIONS

Italian Search Report based on application No. 102017000050228 (9 pages) dated Nov. 21, 2017 (for reference purpose only).

Primary Examiner — Minh D A
(74) Attorney, Agent, or Firm — Viering Jentschura & Partner MBB

(57) ABSTRACT

An asymmetric electronic half-bridge converter includes a positive input terminal and a negative input terminal for receiving a DC voltage, and two output terminals for providing a regulated output voltage or a regulated output current. The electronic converter moreover includes a half-bridge, a transformer and a rectification and filter circuit. The half-bridge includes a first and second electronic switch, connected in series between the two input terminals, wherein a respective capacitance and a respective diode are associated with the first and second electronic switch. A first terminal of the primary winding is connected to the intermediate point between the first and second electronic switch, and a second terminal of the primary winding is connected via a first capacitor to the positive or negative input terminal. The rectification and filter circuit is connected between the secondary winding and the output terminals.

11 Claims, 9 Drawing Sheets

(51) Int. Cl.
*H02M 3/337* (2006.01)
*H05B 33/08* (2006.01)
*H02M 1/42* (2007.01)

(58) Field of Classification Search
CPC .............. H05B 33/0815; H05B 41/042; H05B 41/2827; H05B 41/2822; H05B 41/282; H05B 41/3928; H05B 41/2325; H05B 41/28; H05B 41/04; H05B 41/2881; H05B 41/391; H05B 33/0818; H05B 41/3921; H05B 41/3927; B23K 11/248; B23K 9/1031; B23K 9/1037; B60Q 1/1415; G07F 5/00; G05B 11/013; H02M 1/042; H02M 1/045; H04Q 1/32; H01F 38/10; H01F 30/02; B60J 7/0573; F21K 5/023; H02H 7/0851; Y02B 20/183; Y02B 20/204; H01J 61/56
USPC ........................................................ 315/276
See application file for complete search history.

(56) References Cited

FOREIGN PATENT DOCUMENTS

| WO | 2012116488 A1 | 9/2012 |
| WO | 2015044846 A2 | 4/2015 |

* cited by examiner

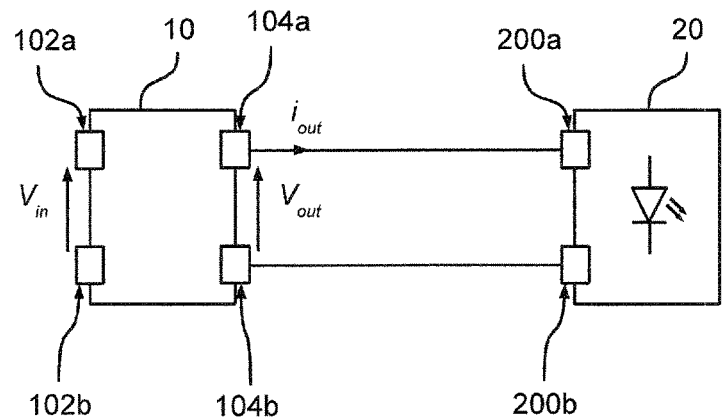
Fig. 1
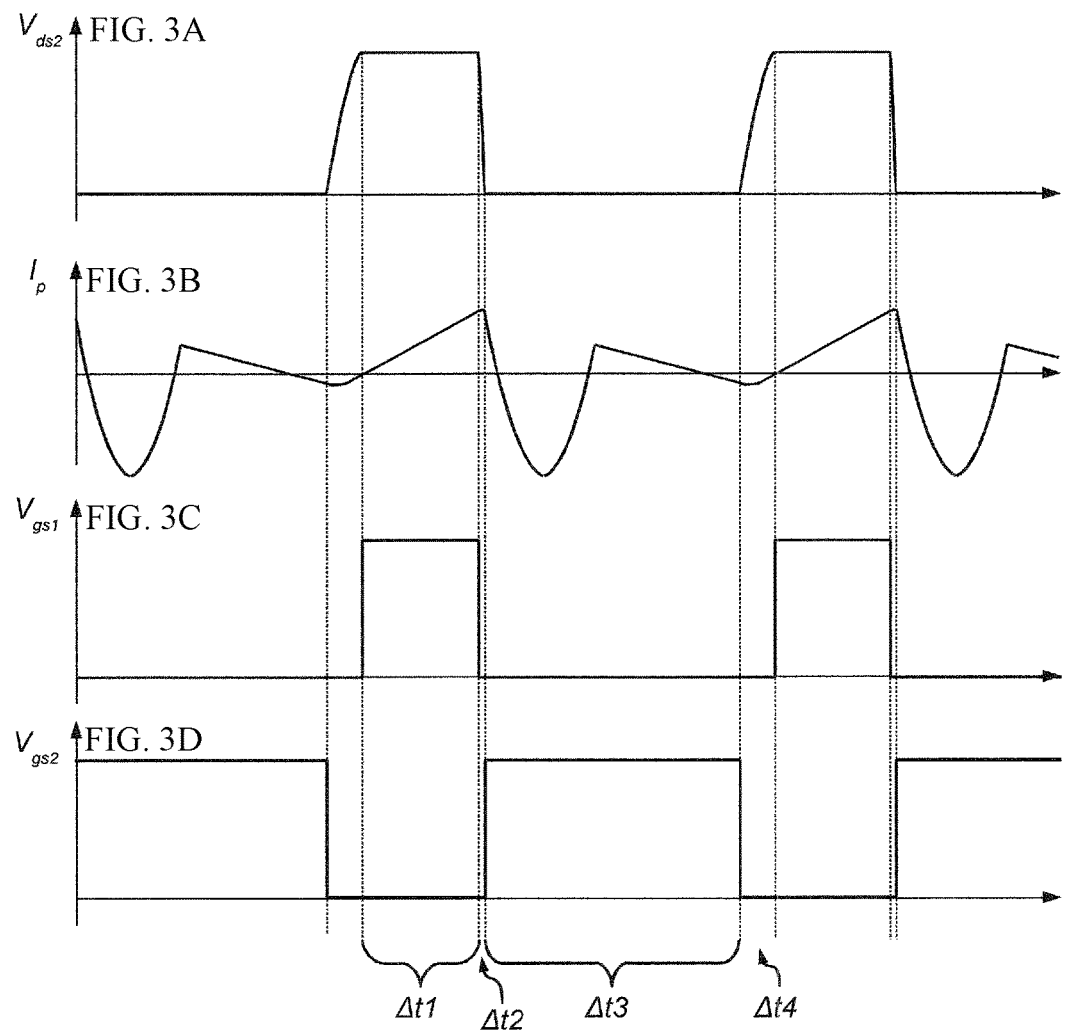

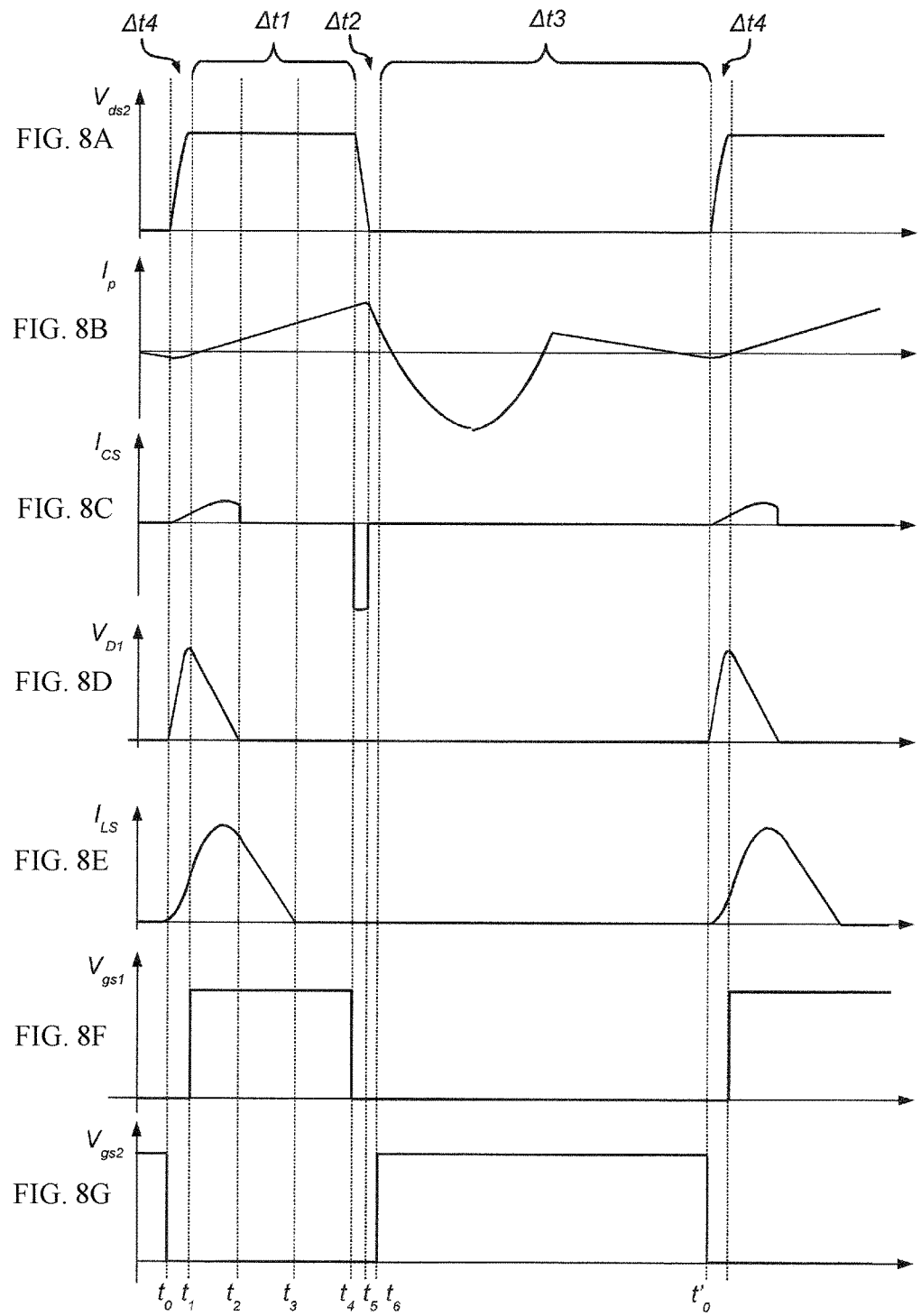

ELECTRONIC CONVERTER AND RELATED METHOD OF OPERATING AN ELECTRONIC CONVERTER

CROSS-REFERENCE TO RELATED APPLICATION

This application claims priority to Italian Patent Application Serial No.: 102017000050228, which was filed May 9, 2017, and is incorporated herein by reference in its entirety and for all reasons.

TECHNICAL FIELD

The description relates to electronic converters.

BACKGROUND

FIG. 1 shows a typical lighting system including an electronic converter 10 and at least one lighting module 20. Generally speaking, a lighting module 20 includes one or more light radiation sources, including e.g. at least one LED (Light Emitting Diode) or other solid-state lighting means, such as e.g. laser diodes.

Specifically, in the presently considered example, the electronic converter 10 is a DC/DC electronic converter. Therefore, the electronic converter 10 includes two input terminals 102a and 102b for receiving an input voltage $V_{in}$ and two output terminals 104a and 104b for the connection to the lighting module(s) 20. As known in the art, direct voltage $V_{in}$ may also be obtained from an alternated voltage (provided e.g. by the mains), e.g. via a rectification circuit, e.g. a diode-bridge rectifier, and optionally a filter, such as e.g. a capacitor connected between the terminals 102a and 102b.

Generally speaking, the electronic converter 10 may be either a voltage generator or a current generator, i.e. the electronic converter 10 supplies at output, via the positive terminal 104a and the negative terminal 104b, a regulated voltage $V_{out}$, such as e.g. 12 or 24 VDC, or a regulated current $i_{out}$. The lighting module 20 includes a positive input terminal 200a and a negative input terminal 200b, for the connection to the terminals 104a and 104b of the electronic converter 10. For example the lighting module 20, such as a LED module including one or more LEDs connected between the terminals 200a and 200b, may be connected, either directly or through a cable, to the electronic converter 10. Therefore, the terminal 200a is connected to the positive terminal 104a, and the terminal 200b is connected to the negative terminal 104b, and thus the lighting module receives the regulated voltage $V_{out}$ or the regulated current $i_{out}$.

Generally speaking, also a plurality of lighting modules 20 may be connected to the electronic converter 10. For example, if a regulated voltage $V_{out}$ is used, the lighting modules 20 may be connected in parallel to the terminals 104a and 104b. On the other hand, if a regulated current $i_{out}$ is used, the lighting modules 20 are typically connected in series between the terminals 104a and 104b.

The light emitted by the light sources of the lighting module 20 is often required to be adjustable, i.e. dimmable. If the electronic converter 10 supplies a regulated current $i_{out}$, the control circuit 112 may directly vary the amplitude of the regulated current $i_{out}$ as a function of a dimming control signal. In addition or as an alternative, the control circuit 112 may enable or disable the output of the electronic converter 10 as a function of a dimming control signal. In this solution, the converter 10 therefore performs the dimming operation, and regulates the average current flowing through the lighting module 20 by switching the converter 10, and therefore the lighting module 20, on or off. For example, the on/off switching is often driven by means of a Pulse Width Modulation (PWM), wherein a control circuit varies the duty cycle as a function of the dimming control signal. Typically, the PWM frequency is in the range between 100 Hz and 2 kHz.

Generally speaking, there are known several types of electronic converters.

For example, FIG. 2 shows a circuit diagram of an asymmetric electronic half-bridge converter 10.

In the presently considered example, the electronic converter 10 therefore includes a half-bridge, i.e. two electronic switches $S_1$ and $S_2$ which are connected (typically directly) in series between the two input terminals 102a/102b, wherein the switching of the electronic switches $S_1$ and $S_2$ is driven by a control unit 112. For example, in the present embodiment the electronic switches $S_1$ and $S_2$ are n-channel Field-Effect Transistors (FETs), e.g. N-MOS, i.e. n-channel MOSFETs (Metal-Oxide-Semiconductor Field-Effect Transistors). The switches $S_1$ and $S_2$ may have respective capacitances $C_{A1}$, $C_{A2}$ (typically the parasitic capacitances) and respective diodes $D_{A1}$, $D_{A2}$ (typically the body diodes) connected in parallel thereto.

In the presently considered embodiment, converter 10 moreover includes a transformer T, including a primary winding T1 and a secondary winding T2. Specifically, transformer T may be modelled as an ideal transformer having a given turns ration 1:n, an inductance $L_M$ which represents the magnetization inductance of transformer T and an inductance $L_R$ representing the leakage inductance, which are shown in FIG. 2 on the primary side of transformer T.

In the presently considered example, the primary winding of transformer T and a capacitor $C_{RP}$ are connected between the intermediate point between the two electronic switches $S_1/S_2$ and the first input terminal 102a (positive terminal) or the second input terminal 102b (negative terminal representing a first ground $GND_1$). Specifically, in the presently considered example, the first terminal of the primary winding T1 of transformer T is connected (e.g. directly) to the intermediate point between the two electronic switches $S_1$ and $S_2$. On the other hand, the second terminal of the primary winding T1 of transformer T is connected via a capacitor $C_{RP}$ to the second input terminal 102b. In addition or as an alternative, the second terminal of the primary winding T1 of transformer T may also be connected via a further capacitor $C_{RP}$ to the first input terminal 102b. Therefore, the switches $S_1$ and $S_2$ may be used for selectively connecting the first terminal of the primary winding T1 of transformer T to voltage $V_{in}$ or to ground $GND_1$, thereby controlling the current flow through the primary winding T1 of transformer T.

On the secondary side T2 of transformer T, the converter 10 includes a rectification circuit, configured to convert the alternated current (AC) provided by the secondary winding T2 into a direct current (DC), and a filter circuit which stabilizes the signal provided by the rectification circuit, so that the output voltage $V_o$ and/or the output current $i_o$ are more stable.

Specifically, in the presently considered example, the converter includes, on the secondary side of transformer T, three branches which are connected (e.g. directly) in parallel, wherein:

a) the first branch includes a first capacitor $C_{RS}$ connected in series to the secondary winding T2 of transformer T,
b) a second branch including a diode D, and
c) a third branch including a second capacitor $C_o$ connected in series with an inductor $L_o$, wherein the outputs 104a and 104b are connected in parallel with the second capacitor $C_o$.

For example, a first terminal of the secondary winding T2 may be connected (e.g. directly) to the cathode of diode D, and the second terminal of the secondary winding T2 is connected (e.g. directly) via capacitor $C_{RS}$ to the anode of diode D. Moreover, a first terminal of inductor $L_o$ may be connected (e.g. directly) to the cathode of diode D, and the second terminal of inductor $L_o$ may be connected (e.g. directly) via capacitor $C_o$ to the anode of diode D (which therefore represents a second ground $GND_2$). The electronic converter 10 is asymmetric because the on times of $S_1$ and $S_2$ are typically different, and mainly depend on the output voltage.

The converter shown in FIG. 2 offers the advantage that such a converter may be driven so as to subject switches $S_1$ and $S_2$ to Zero Voltage Switching (ZVS) and diode D may be subjected to Zero Current Switching (ZCS), so-called soft-switching.

Specifically, the control unit 112 is typically configured to switch switches $S_1$ and $S_2$ alternatively, i.e. only one of the switches $S_1$ and $S_2$ is closed at a given time. Generally speaking, there may also be provided intermediate intervals, during which neither switch $S_1$ nor $S_2$ is closed. For this reason, the control unit 112 is typically configured to drive the switches $S_1$ and $S_2$ of the half-bridge $S_1/S_2$ with the following stages, which are periodically repeated:

during a first time interval $\Delta t1$ switch $S_1$ is closed and switch $S_2$ is open;

during a second time interval $\Delta t2$ switch $S_1$ is open and switch $S_2$ is open;

during a third time interval $\Delta t3$ switch $S_1$ is open and switch $S_2$ is closed; and during a fourth time interval $\Delta t4$ switch $S_1$ is open and switch $S_2$ is open.

For example, FIGS. 3c and 3d respectively show two driver signals $V_{GS1}$ and $V_{GS2}$ for the gate terminals of switches $S_1$ and $S_2$, and FIG. 3A shows the voltage $V_{DS2}$ at the intermediate point between the switches $S_1$ and $S_2$. Specifically, when switch $S_1$ is closed during the time interval $\Delta t1$, the voltage $V_{DS2}$ is equal to voltage $V_{in}$, and when switch $S_2$ is closed during the time interval $\Delta t3$, the voltage $V_{DS2}$ is zero.

On the other hand, the ZVS condition may be achieved by properly sizing the resonant components of the converter (i.e. the inductances and the capacitances). Specifically, as previously mentioned, there are typically provided intermediate switching intervals ($\Delta t2$ and $\Delta t4$) during which neither switch, $S_1$ or $S_2$, is closed. During such intervals the current $I_P$ on the primary side of transformer T1 should charge and discharge the capacitances $C_{A1}$ and $C_{A2}$ associated to the switches $S_1$ and $S_2$, so that the switches $S_1$ and $S_2$ may be closed in the following zero voltage switching stage, i.e.:

voltage $V_{DS2}$ should be zero at the end of interval $\Delta t2$, i.e. capacitance $C_{A2}$ should be discharged during time interval $\Delta t2$; and voltage $V_{DS2}$ should be equal to voltage $V_{in}$ at the end of interval $\Delta t4$, i.e. capacitance $C_{A2}$ should be charged during time interval $\Delta t4$.

As shown in FIG. 3, specifically in FIG. 3B, the discharging of capacitance $C_{A2}$ during time interval $\Delta t2$ may be easily ensured, because the current $I_P$ is positive at the end of interval $\Delta t2$. Specifically, the amplitude of the current $I_P$ depends on the duration of interval $\Delta t1$, which in turn is regulated in order to achieve a desired output voltage $V_{out}$ or output current $i_{out}$.

On the other hand, in order to charge capacitance $C_{A2}$, current $I_P$ is required to be negative during time interval $\Delta t4$. To this end, the resonant components of the electronic converter 10, e.g. the transformer T, e.g. the magnetization inductance $L_M$, may be sized so that the primary winding T1 of transformer T provides, during time interval $\Delta t4$, a negative current $I_P$. In this case, the duration of time interval $\Delta t3$ should be controlled e.g. by verifying that current $I_P$ is lower than a given threshold at the end of time interval $\Delta t3$.

The energy stored in transformer T depends therefore on the operating conditions of the electronic converter 10, e.g. the energy charged during time interval $\Delta t1$ (i.e. while switch $S_1$ is closed) and the output load. Therefore, the sizing of the inductances of the electronic converter 10 is typically carried out assuming the worst case. However, this also implies that the electronic converter 10 often operates in less than optimal conditions, which reduces the efficiency of converter 10. For example, details about the operation and the possible sizing of the circuit shown in FIG. 2 are described in document PCT/IB2014/064657, the content whereof is incorporated herein to this end.

Moreover, as explained in the foregoing, the discharge of capacitance $C_{A2}$ during the time interval $\Delta t2$ may be ensured easily, because the current $I_P$ is typically high during the interval $\Delta t1$. However, this implies that the discharging time of capacitance $C_{A2}$ is short, which may increase the electromagnetic interference.

For this reason, it may be necessary for a capacitor to be connected (e.g. directly) in parallel with switch $S_2$, so as to increase the value of capacitance $C_{A2}$. As a matter of fact, a high capacitance $C_{A2}$ enables increasing the discharging time of capacitance $C_{A2}$, i.e. reducing the value dV/dt, thus reducing the electromagnetic interference. However, this implies that the charging of capacitance $C_{A2}$ during time interval $\Delta t4$ is slower, i.e. transformer T should supply a current $I_P$ with higher amplitude during time interval $\Delta t4$. As a consequence, transformer T should be adapted to manage a higher amount of energy, which raises the temperature of transformer T and further reduces the efficiency of the electronic converter 10.

SUMMARY

The present description aims at providing solutions which are adapted to reduce the amount of energy that the transformer is supposed to manage.

According to various non-limiting embodiments, the object may be achieved due to an electronic converter having the features set forth in the claims that follow. The claims also concern a corresponding method of operating an electronic converter.

The claims are an integral part of the technical teaching provided herein with reference to the description.

As described in the foregoing, various embodiments of the present description concern an asymmetric electronic half-bridge converter.

In various non-limiting embodiments, the electronic converter includes a positive input terminal and a negative input terminal, for receiving a direct voltage, and two output terminals for providing a regulated output voltage or a regulated output current. For example, at least one LED may be connected between such two output terminals.

In various non-limiting embodiments, the electronic converter includes a half-bridge, including a first and a second electronic converter connected in series between the two input terminals, wherein a respective capacitance and a respective diode are associated with the first and the second electronic converter. For example, the electronic switches may be field-effect transistors, preferably n-channel field-effect transistors, e.g. N-MOS.

In various non-limiting embodiments, the electronic converter includes a transformer, including a primary winding and a secondary winding. A first terminal of the primary winding is connected to the intermediate point between the first and the second electronic switch. A second terminal of the primary winding is connected via a first capacitor to the positive input terminal or to the negative input terminal.

In various non-limiting embodiments, a rectification and filter circuit is connected between the secondary circuit and the output terminals. For example, the rectification and filter circuit may include:
a diode,
a third capacitor, wherein the third capacitor and the secondary winding are connected in series between the cathode and the anode of the diode; and
an inductor, wherein the inductor and the two output terminals are connected in series between the cathode and the anode of the diode; a further capacitor may be connected between the two output terminals.

In various non-limiting embodiments, the first and the second electronic switch are driven by means of a control unit. For example, the control unit may drive the switches according to the following time intervals, which are repeated periodically:
a) a first time interval, wherein the first switch is closed and the second switch is open,
b) a following second time interval, wherein the first switch is open and the second switch is open,
c) a following third time interval, wherein the first switch is open and the second switch is closed, and
d) a following fourth time interval, wherein the first switch is open and the second switch is open.

In various non-limiting embodiments, the electronic converter moreover includes a snubber circuit on the primary side of the electronic converter. In various embodiments, the snubber circuit includes a second capacitor, an inductor, a first diode and a second diode.

For example, in various non-limiting embodiments, the first terminal of the second capacitor is connected to the first terminal of the primary winding, the second terminal of the second capacitor is connected to the cathode of the first diode, and the anode of the first diode is connected to the negative input terminal. The inductor and the second diode are connected in series between the cathode of the first diode and the second terminal of the primary winding, wherein the cathode of the second diode is directed towards the second terminal of the primary winding.

As an alternative, the first terminal of the second capacitor is connected to the first terminal of the primary winding, the second terminal of the second capacitor is connected to the anode of the first diode and the cathode of the first diode is connected to the positive input terminal. The inductor and the second diode are connected in series between the anode of the first diode and the second terminal of the primary winding, wherein the anode of the second diode is directed towards the second terminal of the primary winding.

Specifically, as will be described in the following, the snubber circuits according to the present description enable varying the capacitance associated to the intermediate point of the half-bridge.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 1 shows and embodiment of a lighting system;
FIG. 3A shows the voltage at the intermediate point between switches;
FIG. 3B shows the discharging of capacitance;
FIGS. 3C-3D shows driver signals for the gate terminals of switches;
FIG. 8A shows the voltage between the drain and source terminals of transistor $S_2$;
FIG. 8B shows the current flowing through the primary winding of the transformer;
FIG. 8C shows the current flowing through a capacitor;
FIG. 8D shows the voltage across a diode;
FIG. 8E shows the current which flows through an inductor;
FIG. 8F shows the voltage between the gate and source terminals of a transistor;
FIG. 8G shows the voltage between the gate and source terminals of a transistor.

DETAILED DESCRIPTION OF EMBODIMENTS

In the following description, various specific details are given to provide a thorough understanding of the embodiments. The embodiments may be practiced without one or several specific details, or with other methods, components, materials, etc. In other instances, well-known structures, materials or operations are not shown or described in detail in order to avoid obscuring various aspects of the embodiments.

Reference throughout this description to "one embodiment" or "an embodiment" means that a particular feature, structure, or characteristic described in connection with the embodiment is included in at least one embodiment. Thus, the possible appearances of phrases such as "in one embodiment" or "in an embodiment" in various places throughout this description are not necessarily all referring to the same embodiment. Furthermore, particular features, structures, or characteristics may be combined in any suitable manner in one or more embodiments.

The headings provided herein are for convenience only, and therefore do not interpret the extent of protection or scope of the embodiments.

Figure 2:
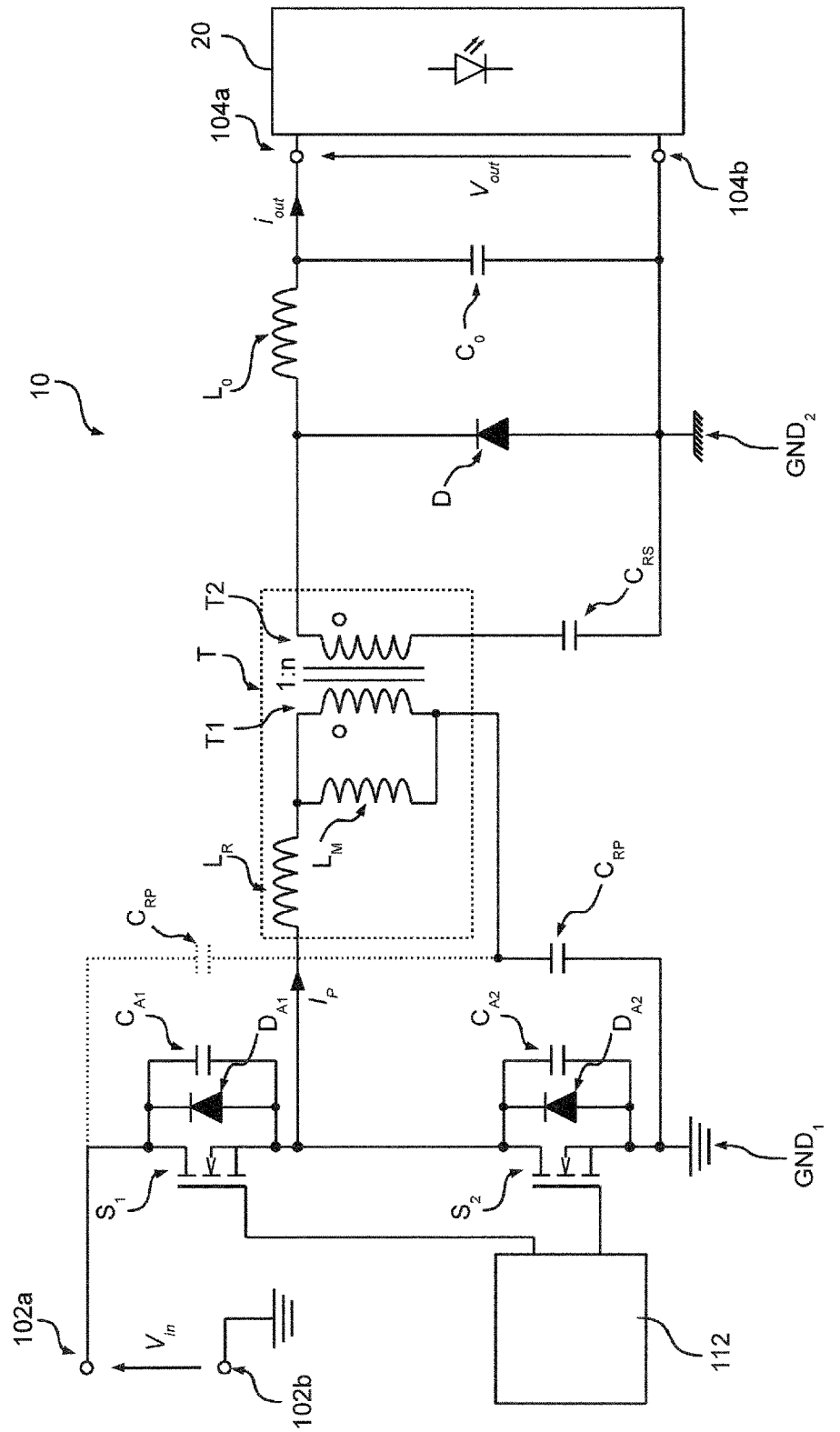
FIG. 2 shows a circuit diagram of an asymmetric electronic half-bridge converter.

In the following FIGS. 4 to 9, the parts, the elements or the components which have already been described with reference to FIGS. 1 to 3 are denoted with the same references which have previously been used in the Figures; the description of the previously described elements will not be repeated in the following, in order not to overburden the present detailed description.

As mentioned in the foregoing, the present description concerns an electronic converter 10a which overcomes the drawbacks of the electronic converters 10 known in the art, as described with reference to FIGS. 1 to 3, i.e. asymmetric electronic half-bridge converters.

Specifically, the inventors have observed that it would be convenient for the capacitance between the intermediate point of the half-bridge (including switches $S_1$ and $S_2$) and ground $GND_1$ to vary in time. Specifically, the capacitance should be small during the time interval $\Delta t4$ so that, at the beginning of time interval $\Delta t4$, a (negative) current $I_P$ having small amplitude may suffice to charge the capacitance, while enabling a ZVS switching of switch $S_1$. On the other hand, the capacitance should be high during the time interval $\Delta t2$, so that, during time interval $\Delta t2$, the discharging time of the capacitance is prolonged, thus reducing electromagnetic interference.

Figure 4:
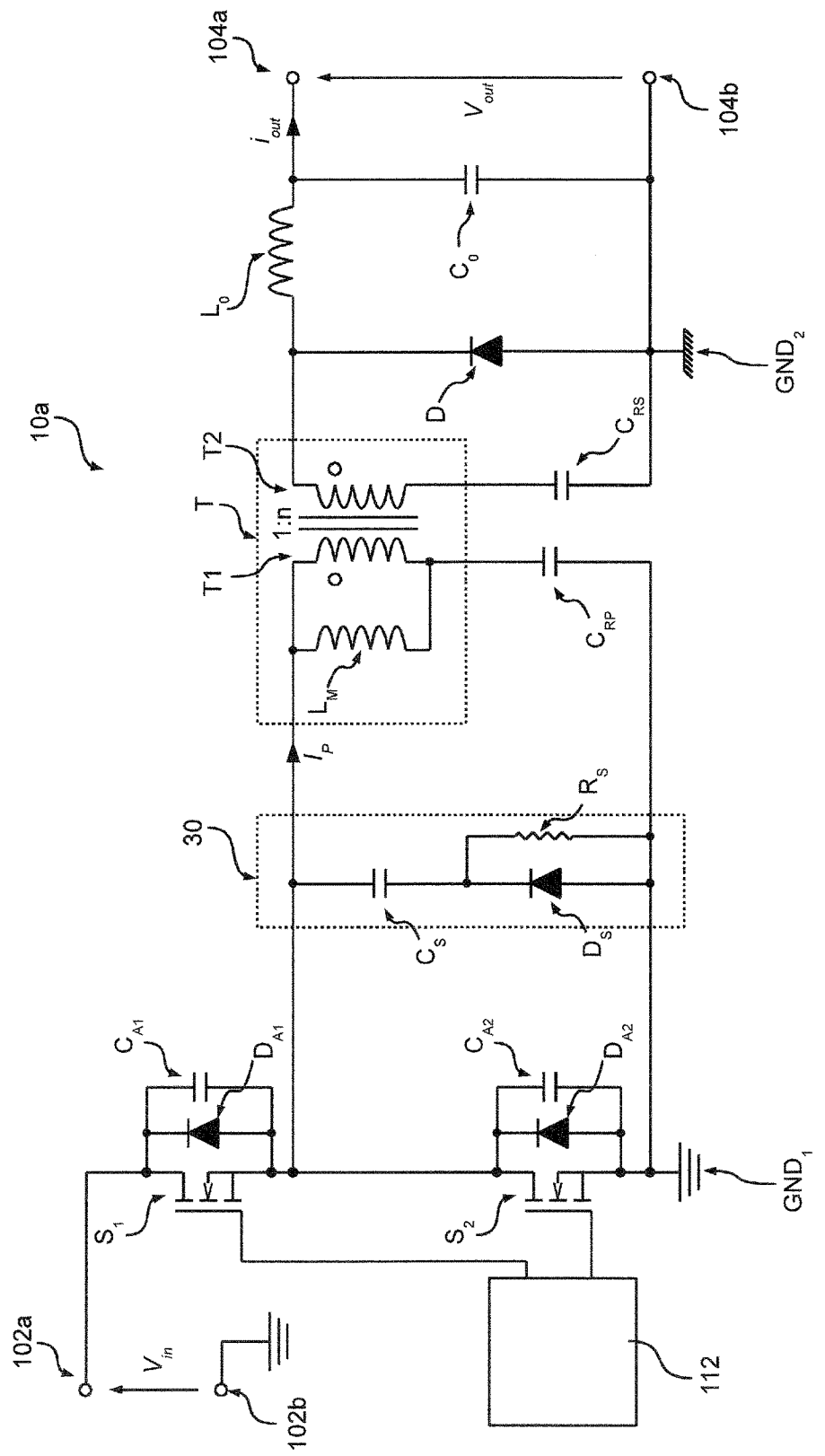
FIG. 4 shows a first embodiment of an electronic converter in accordance with the present description.

FIG. 4 shows a first embodiment of an electronic converter 10a according to the present non-limiting description, which is based substantially on the circuit diagram shown in FIG. 2. For simplicity, FIG. 4 only shows a capacitor $C_{RP}$ directly connected in series with the primary winding T1 of transformer T, between the intermediate point of the half-bridge $S_1/S_2$ and ground $GND_1$. Moreover, the Figure only shows the magnetization inductance $L_M$ of transformer T.

Therefore, also in this case, the electronic converter 10a receives at input, via two input terminals 102a and 102b ($GND_1$), a voltage $V_{in}$, and provides at output, via two output terminals 104a and 104b, a regulated voltage $V_{out}$ or preferably a regulated current $i_{out}$. For example, a lighting module 20 may be connected to the terminals 104a and 104b (see FIG. 1).

The converter 10a moreover includes a half-bridge, i.e. two electronic switches $S_1$ and $S_2$ which are connected in series between the two input terminals 102a and 102b/$GND_1$, wherein the switching of the electronic switches $S_1$ and $S_2$ is driven by means of a control unit 112. For example, the control unit 112 may be an analog and/or digital circuit, such as e.g. a microprocessor which is programmed via software code. For example, in various non-limiting embodiments, the control unit 112 is configured to drive the switches as a function of the output current $i_{out}$, for example in order to regulate the output current $i_{out}$ to a desired (average) value.

In various non-limiting embodiments, the electronic switches $S_1$ and $S_2$ are N-MOS transistors, i.e. n-channel MOSFETs (Metal-Oxide-Semiconductor Field-Effect Transistors). Such switches $S_1$ e $S_2$ may have, connected in parallel thereto, respective capacitances $C_{A1}$, $C_{A2}$ and respective diodes $D_{A1}$, $D_{A2}$. For example, the capacitances $C_{A1}$ and $C_{A2}$ may represent the parasitic capacitance of a MOSFET, and/or may be implemented by means of additional capacitors which are connected in parallel to the switches $S_1$ and $S_2$. On the other hand, diodes $D_{A1}$ and $D_{A2}$ may represent the body diodes of a MOSFET, and/or they may be implemented by means of additional diodes.

In the presently considered embodiment, the converter 10a also includes a transformer T, including a primary winding T1 and a secondary winding T2. Generally speaking, the electronic converter 10 may also include further inductors, which are connected in series and/or in parallel with the primary T1 and/or secondary winding T2 of transformer T.

In the presently considered embodiment, the first terminal of the primary winding T1 of transformer T is connected (e.g. directly) to the intermediate point between the two electronic switches $S_1$ and $S_2$. On the other hand, the second terminal of the primary winding T1 of transformer T is connected, via a capacitor $C_{RP}$, to the second input terminal 102b, i.e. to ground $GND_1$.

Therefore, the switches $S_1$ and $S_2$ may be used to selectively connect the first terminal of the primary winding T1 of transformer T to voltage $V_{in}$ or to ground $GND_1$.

In the presently considered non-limiting embodiment, the electronic converter 10a includes, on the secondary side, three branches which are (preferably directly) connected in parallel, wherein:
a) the first branch includes a first capacitor $C_{RS}$ connected in series to the secondary winding T2 of transformer T,
b) a second branch including a diode D, and
c) a third branch including an inductor $L_o$ connected in series with output 104a/104b.

In various non-limiting embodiments, a second capacitor $C_o$ may be connected in parallel with output 104a/104b. The capacitor is optional and it is used, e.g. in the case of a resistive load, for keeping the output voltage constant; however, in the case of a LED load, the voltage of the load may be constrained by the voltage of the LEDs itself, and therefore capacitor $C_o$ may also be omitted.

Specifically, in the presently considered example, a first terminal of the secondary winding T2 is connected (e.g. directly) to the cathode of diode D, and the second terminal of the secondary winding T2 is connected (e.g. directly) through capacitor $C_{RS}$ to the anode of diode D. Moreover, a first terminal of inductor $L_o$ is connected (e.g. directly) to the cathode of diode D, and the second terminal of inductor $L_o$ is connected (e.g. directly) to the positive terminal of the output, and the negative terminal of the output may be connected (e.g. directly) to the anode of diode D.

As explained in the foregoing, the converter is typically sized so to have a desired efficiency at the high output voltages, thus ensuring the ZVS condition for $S_1/S_2$.

Moreover, as stated in the foregoing, it would be advantageous for the capacitance between the intermediate point of the half-bridge (including switches $S_1$ and $S_2$) and ground $GND_1$ to be adapted to vary in time. Specifically, the capacitance should be small during time interval $\Delta t4$, so that, at the beginning of time interval $\Delta t4$, a (negative) current $I_P$ having reduced amplitude may suffice to charge the capacitance, while enabling a ZVS switching of switch $S_1$. Conversely, the capacitance should be higher during time interval $\Delta t2$, so that, during time interval $\Delta t2$, the discharging time of the capacitance is prolonged, thereby reducing the electromagnetic interference.

In the presently considered non-limiting embodiment, the variability of the capacitance is achieved by means of a snubber circuit 30, connected between the intermediate point of the half-bridge and ground $GND_1$.

Specifically, in the presently considered non-limiting embodiment, the snubber circuit includes a capacitor $C_S$ and a diode $D_S$ which are connected in series, and a resistor $R_S$ connected in parallel with diode $D_S$.

Therefore, when the current $I_P$ is negative during time interval $\Delta t4$ (the switches $S_1$ and $S_2$ being open), the capacitor $C_S$ is connected in parallel with capacitance $C_{A2}$ and in series with the resistor, thus reducing the actual value of the capacitance. Conversely, when the current $I_P$ is positive and has a higher value, during time interval $\Delta t2$, the capacitor $C_S$ is connected in series with the diode $D_S$, i.e. the influence of the capacitor $C_S$ is higher, which is the effect sought after in order to reduce the dV/dt.

However, this embodiment has the drawback that the current required for charging capacitor $C_S$ also flows through resistor $R_S$, which reduces the efficiency of the electronic converter 10.

Figure 5:
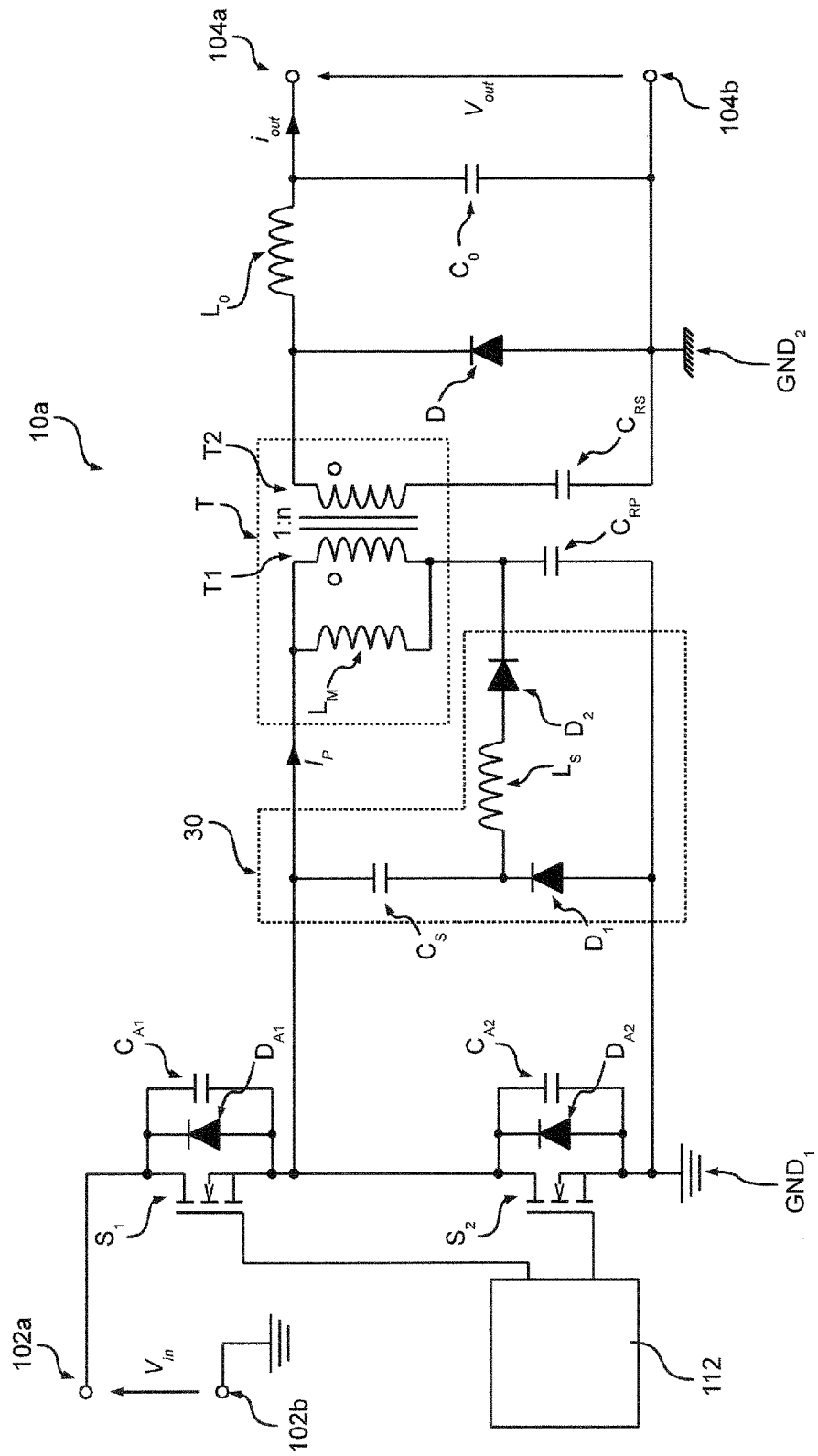
FIG. 5 show a second embodiment of an electronic converter.

FIG. 5 shows an embodiment which overcomes the drawback.

Specifically, in the presently considered embodiment, the snubber circuit 30 again includes a capacitor $C_S$ and a diode $D_1$ connected in series. In detail, in the presently considered embodiment, a first terminal of capacitor $C_S$ is connected (e.g. directly) to the intermediate point of half-bridge $S_1/S_2$, i.e. the source terminal of transistor $S_1$ and the drain terminal of transistor $S_2$, which are also connected to the first terminal of primary winding T1. The second terminal of capacitor $C_S$ is connected (e.g. directly) to the cathode of diode $D_1$, and the anode of diode $D_1$ is connected (e.g. directly) to ground $GND_1$, i.e. terminal 102b.

Moreover, an inductor $L_S$ and a second diode $D_2$ are connected (e.g. directly) between the cathode of diode $D_1$ and the second terminal of primary winding $T_1$, which in turn is connected, via capacitor $C_{RP}$, to ground $GND_1$. Specifically, the anode of diode $D_2$ is directed towards the cathode of diode $D_1$, and the cathode of diode $D_2$ is directed towards the second terminal of primary winding T1. For example, in the presently considered embodiment, a first terminal of inductor $L_S$ is connected (e.g. directly) to the cathode of diode $D_1$, a second terminal of inductor $L_S$ is connected (e.g. directly) to the anode of diode $D_2$ and the cathode of diode $D_2$ is connected (e.g. directly) to the second terminal of primary winding T1.

Figure 6:
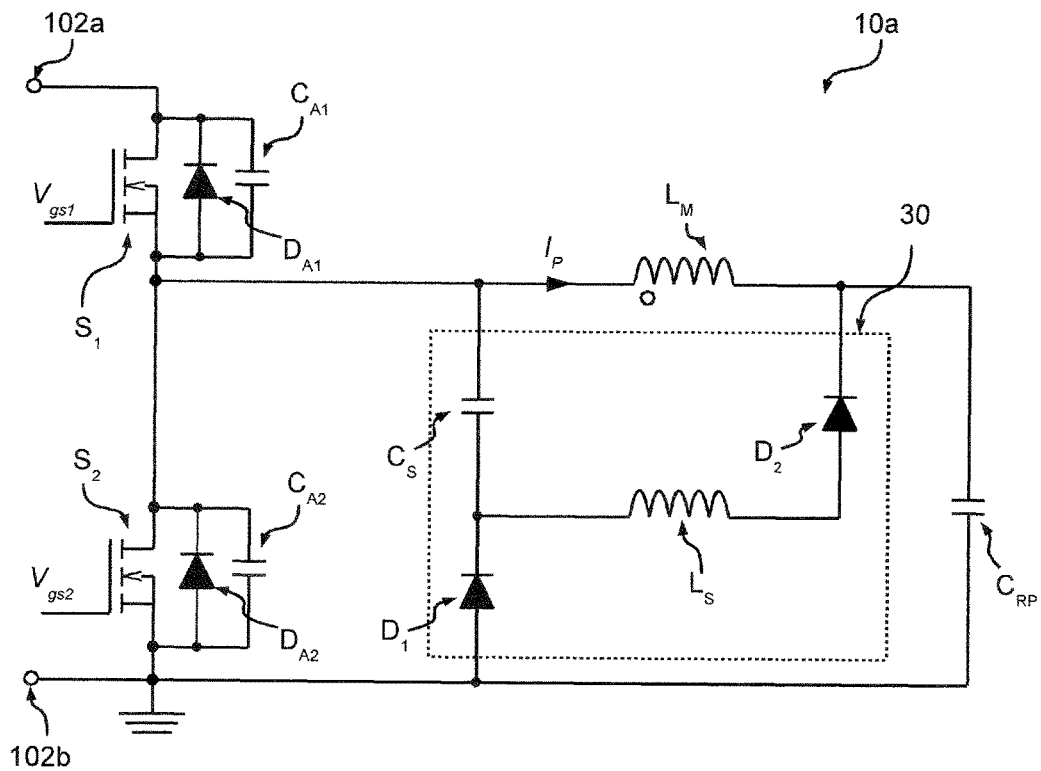
FIG. 6 shows a simplified circuit diagram of an electronic converter.

The operation of the circuit will now be described with reference to FIG. 6, which shows a simplified circuit diagram of the electronic converter 10a.

In this regard, FIGS. 7A to 7E show different operation states of the circuit in FIG. 6, and FIGS. 8A to 8G show some waveforms, specifically:

FIG. 8A shows the voltage $V_{ds2}$ between the drain and source terminals of transistor $S_2$;

FIG. 8B shows the current $I_P$ flowing through the primary winding T1 of the transformer;

FIG. 8C shows the current $I_{CS}$ flowing through capacitor $C_S$;

FIG. 8D shows the voltage $V_{D1}$ across diode $D_1$;

FIG. 8E shows the current $I_{LS}$ which flows through inductor $L_S$;

FIG. 8F shows the voltage $V_{gs1}$ between the gate and source terminals of transistor $S_1$, i.e. the driver signal for transistor $S_1$, and FIG. 8G shows the voltage $V_{gs2}$ between the gate and source terminals of transistor $S_2$, i.e. the driver signal for transistor $S_2$.

Specifically, at a time $t_0$ the switch $S_2$ is opened. As stated in the foregoing, at time $t_0$, the current $I_P$ is negative and the voltage $V_{ds2}$ is zero.

Figure 7A:
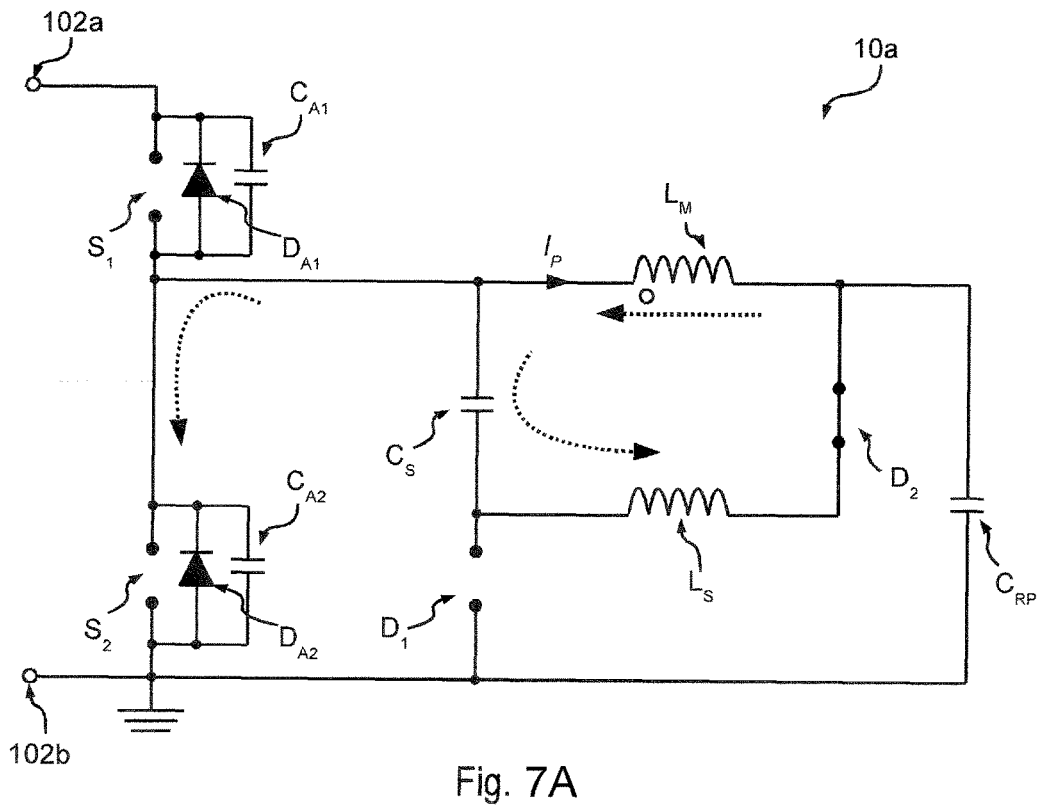
FIG. 7A shows an operation state of FIG. 6 where a portion of the current $I_P$ charges a capacitance connected in parallel with a switch.

As shown in FIG. 7A, a portion of the current $I_P$ charges capacitance $C_{A2}$ connected in parallel with switch $S_2$, and the voltage $V_{ds2}$ increases.

Moreover, as diode $D_1$ is open and diode $D_2$ is closed, a portion of the current $I_P$ charges the resonant circuit including the capacitor $C_S$ and the inductor $L_S$ (see FIG. 8C, which shows the current $I_{CS}$ which flows through capacitor $C_S$).

Specifically, if the inductance of inductor $L_S$ is higher than the magnetization inductance $L_M$ of transformer T, e.g. at least twice as high, the current $I_{CS}$ is low and consequently the voltage $V_{D1}$ at the diode $D_1$ substantially corresponds to the voltage $V_{ds2}$, while the voltage at capacitor $V_{CS}$ remains approximately zero. For example, in various non-limiting embodiments, the capacitance of capacitor $C_S$ may be in the range of 1 pF-10 nF, and the inductance of inductor $L_S$ may be in the range from 200 uH-10 mH.

Therefore, the main portion of current $I_P$ charges, during this operation step, capacitance $C_{A2}$ until voltage $V_{ds2}$ equals voltage $V_{in}$. As a matter of fact, as the inductance $L_S$ has a high value, the current through capacitance $C_S$ will be small. At this stage diode $D_{A1}$ may start operation, thereby keeping voltage $V_{ds2}$ equal to voltage $V_{in}$.

Figure 7B:
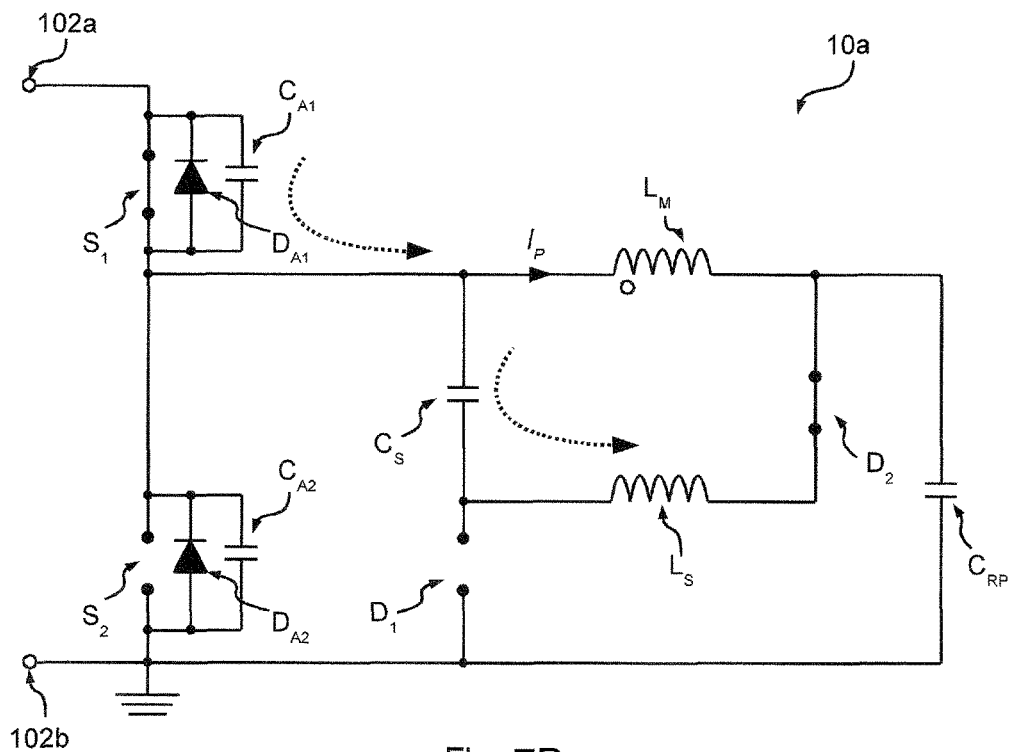
FIG. 7B shows an operation state of FIG. 6 with the switch closed.

At a time $t_1$, the control unit 112 then closes switch $S_1$ (see FIG. 7B). Specifically, the switching may take place at zero voltage, because the voltage $V_{ds2}$ is equal to voltage $V_{in}$.

Therefore, the current $I_P$ increases in a substantially linear manner. However, a portion of the current is also provided to capacitor $C_S$ and to inductor $L_S$. Specifically, the capacitor $C_S$ and the inductor $L_S$ are in resonance. As a consequence, the voltage $V_{CS}$ increases and the voltage $V_{D1}$ to diode $D_1$ decreases (see FIG. 8D).

Specifically, ad a time $t_2$, the voltage $V_{CS}$ to capacitor $C_S$ reaches a maximum value (substantially voltage $V_{in}$) and the voltage $V_{D1}$ to diode $D_1$ becomes zero. However, the current $I_{LS}$ keeps on flowing through inductor $L_S$, and therefore the diode $D_1$ is closed.

Figure 7C:
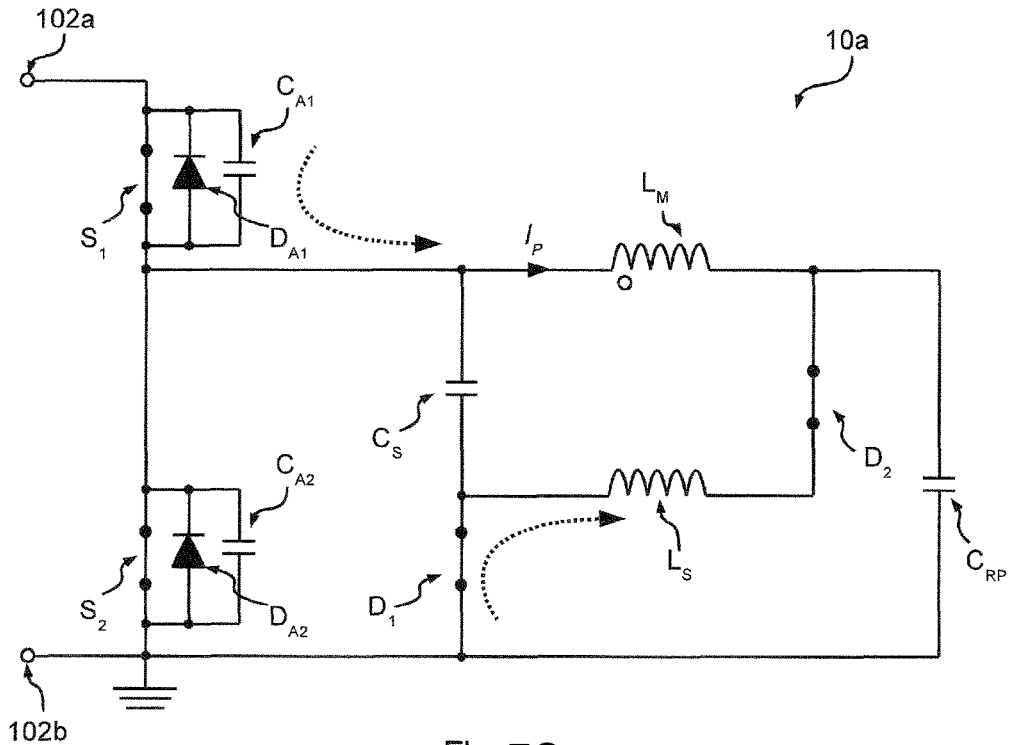
FIG. 7C shows an operation state of FIG. 6 where the intermediate point between a capacitor and inductor are connected to ground.

Consequently, from time $t_2$, the intermediate point between capacitor $C_S$ and inductor $L_S$ is connected to ground $GND_1$ (as shown in FIG. 7C). Therefore, capacitor $C_S$ keeps its voltage, and the current $I_{LS}$ (see FIG. 8E) flowing through inductor $L_S$ decreases in a substantially linear fashion, until current $I_{LS}$ becomes zero at a time $t_3$.

Figure 7D:
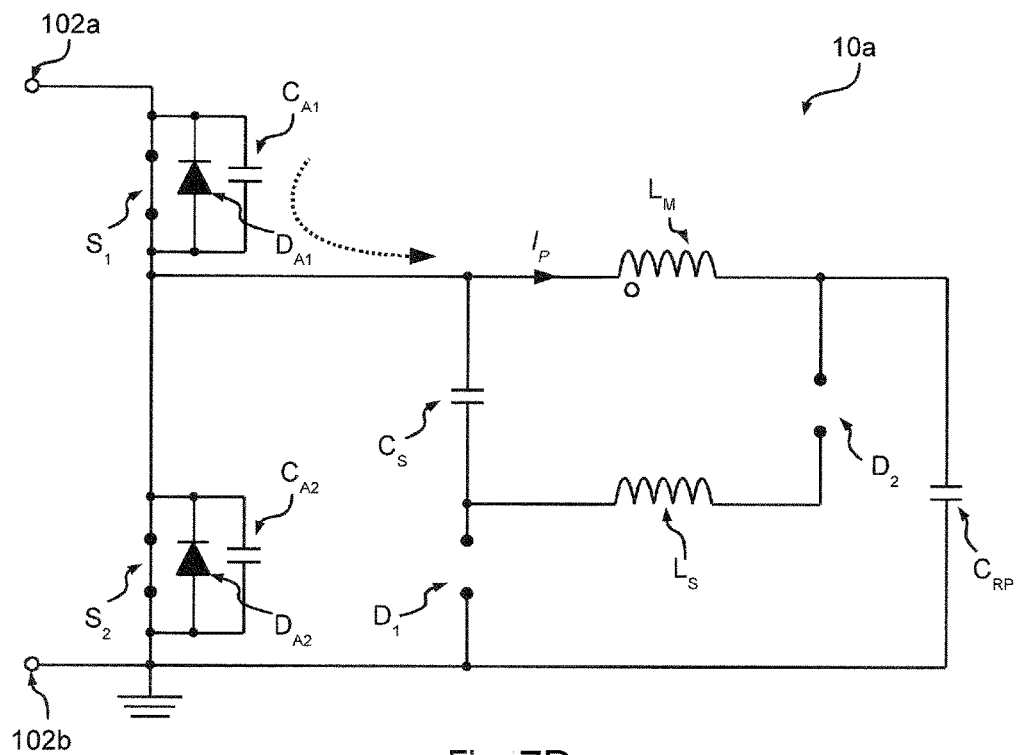
FIG. 7D shows an operation state of FIG. 6 where an inductor is coupled to a ground and to a capacitor by means of parasitic capacitances of diodes.
Figure 7E:
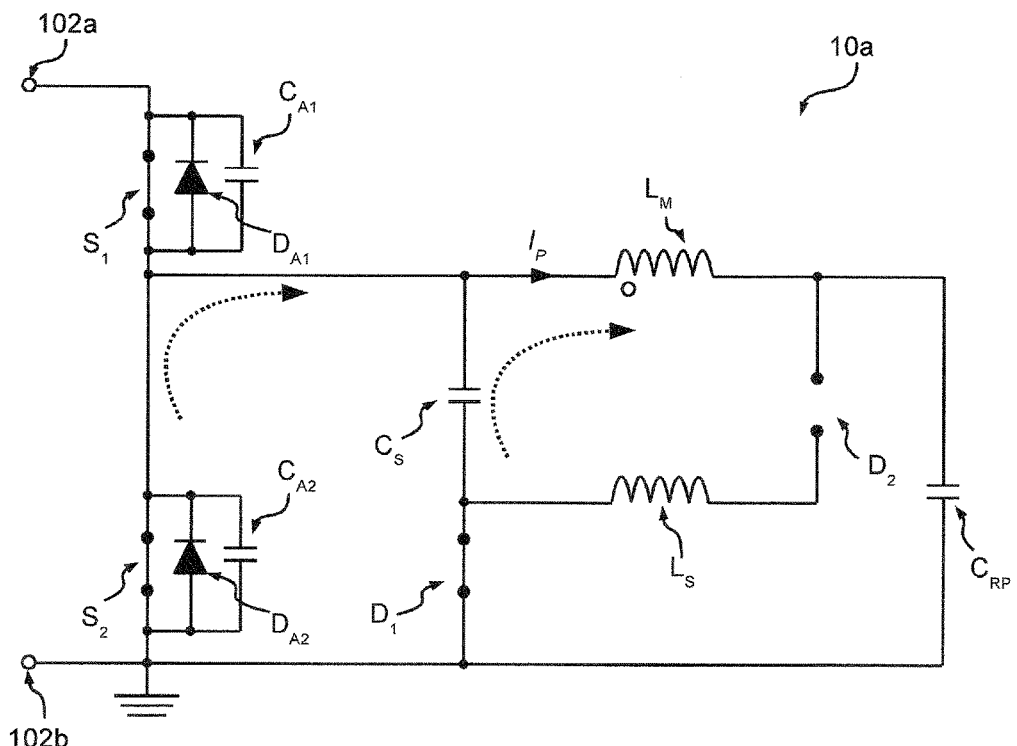
FIG. 7E shows an operation state of FIG. 6 where a diode is closed, connecting a capacitor in parallel with a capacitance.

Therefore, at time $t_3$ the diodes $D_1$ and $D_2$ are opened, i.e. the inductor $L_S$ is coupled to ground $GND_1$ and to capacitor $C_{RP}$ only by means of the parasitic capacitances of the diodes $D_1$ and $D_2$ (see FIG. 7D).

Therefore, from time $t_3$, the electronic converter 10a behaves as a traditional electronic half-bridge converter, and the control unit 112 may open the switch $S_1$ at a time $t_4$. Therefore, switch $S_1$ is closed for a time interval $\Delta t1$ (between times $t_1$ and $t_4$) and the control unit 112 may vary the duration in such a way as to regulate the output voltage $V_{out}$ or the output current $i_{out}$ to a desired value.

Therefore, at time t4, the current $I_P$ is positive (and substantially exhibits the maximum amplitude). As a consequence, diode $D_1$ is closed, thus connecting the capacitor $C_S$ in parallel with capacitance $C_{A2}$ (see FIG. 7E), i.e. capacitor $C_S$ and capacitance $C_{A2}$ are discharged, thus reducing voltage $V_{ds2}$ (see FIGS. 8a and 8c).

Specifically, at a time $t_5$, the voltage $V_{ds2}$ becomes zero, and consequently diode $D_1$ is opened and diode $D_{A2}$ is closed, i.e. capacitance $C_{A2}$ and capacitor $C_S$ remain discharged.

Therefore, from time $t_5$, the control unit 112 may close switch $S_2$ at zero voltage. For example, in FIG. 8G, the control unit 112 closes switch $S_2$ at a time $t_6$, wherein the duration of interval $\Delta t4$ (between times $t_4$ and $t_6$) is constant. However, the control unit may also monitor the voltage $V_{ds2}$.

Finally, the control unit 112 may open switch $S_2$ at a time $t'_0$, and a new switching cycle begins. For the operation of the converter between the times $t_6$ and $t'_0$ reference may be made to document PCT/IB2014/064657.

Therefore, thanks to the use of inductor $L_S$ and of diode $D_2$, the capacitor $C_S$ is minimally charged in the intervals between times $t_0$ and $t_1$. As a consequence, it is sufficient for the resonant components, e.g. the magnetization inductance $L_M$ of transformer T, to be adapted to supply a small (negative) current at the beginning of time $t_0$. On the other hand, capacitor $C_S$ is mainly charged when switch $S_1$ is closed and the diodes $D_1$ and $D_2$ allow the inductor $L_S$ to be completely discharged.

On the other hand, in the interval between times $t_4$ and $t_5$ capacitor $C_S$ is connected, through diode $D_1$, in parallel with capacitance $C_{A2}$, thereby reducing the dV/dt ratio. As a consequence, the discharging time is increased and the electromagnetic interference is improved.

In the previously discussed embodiments, a capacitor $C_{RP}$ is directly connected in series with the primary winding T1 of transformer T between the intermediate point of the half-bridge $S_1/S_2$ and ground $GND_1$. Generally speaking, as stated in the foregoing, in addition or as an alternative the second terminal of the primary winding T1 or transformer T might be connected via a capacitor $C_{RP}$ also to the first input terminal 102a. As a matter of fact, generally speaking, the primary winding T1 of transformer T and a capacitor $C_{RP}$ are connected in series between the intermediate point between the two electronic switches $S_1/S_2$ and the first input terminal 102 (positive terminal) or the second input terminal 102b (negative terminal).

Figure 9:
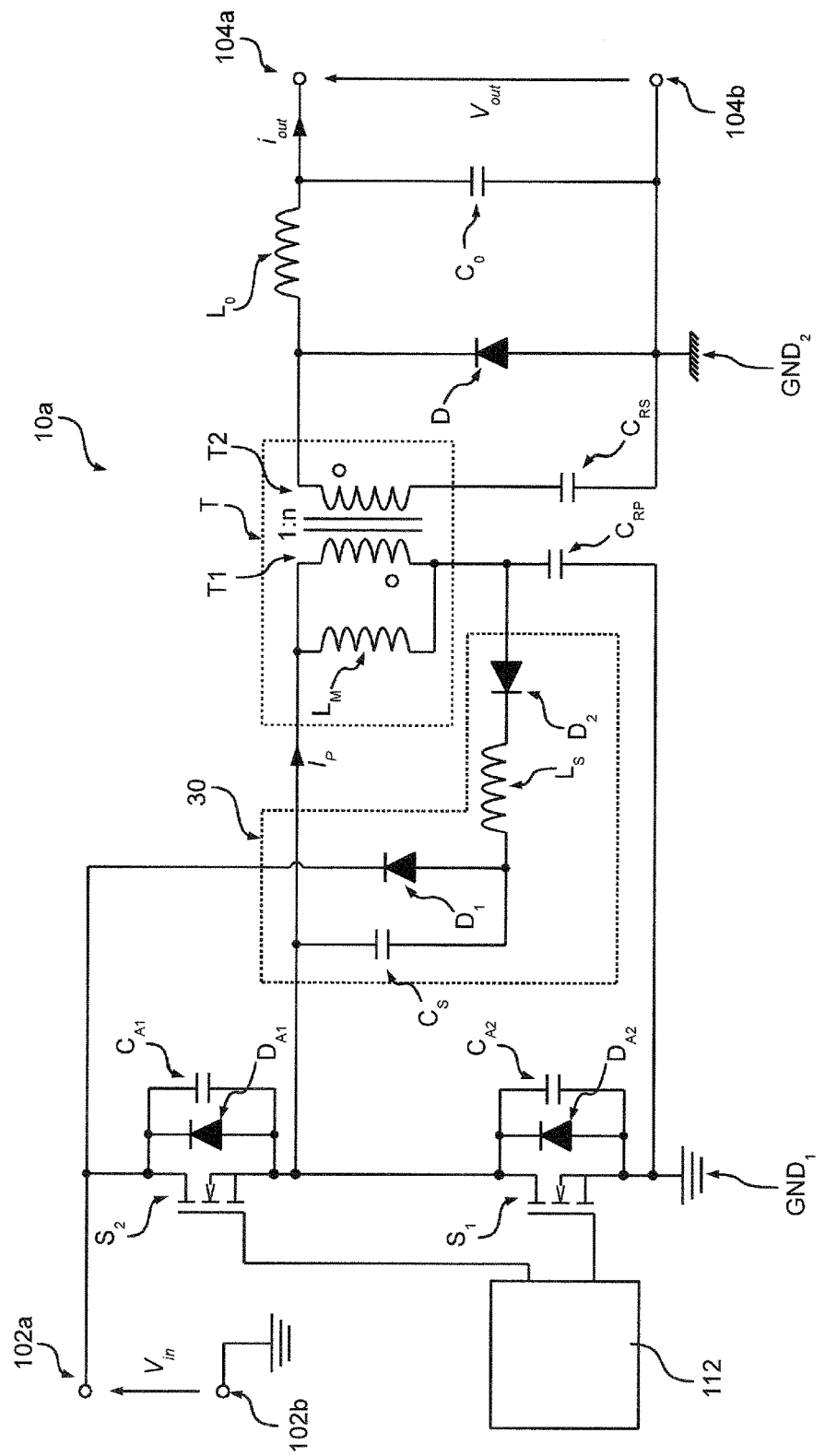
FIG. 9 shows a third embodiment of an electronic converter in accordance with the present description.

Moreover, as shown in FIG. 9, also the snubber circuit 20 may be connected to the first input terminal 102a (positive terminal) and not to the second input terminal 102b (negative terminal). However, in such a case some modifications are required. Specifically, it would be necessary to reverse also the direction of transformer T (symbolized in the drawing as a small circle) and the operation of switches $S_1$ and $S_2$ would have to be inverted. Therefore, in the presently considered embodiment, switch $S_2$ is connected to the first input terminal 102a (positive terminal) and switch $S_1$ is connected to the second input terminal 102b (negative terminal).

Finally, also the direction of diodes $D_1$ and $D_2$ is reversed. Therefore, in the presently considered embodiment, the snubber circuit 30 again includes a capacitor $C_S$ and a diode $D_1$ connected in series. Specifically, in the presently considered embodiment, a first terminal of capacitor $C_S$ is connected (e.g. directly) to the intermediate point of the half-bridge $S_1/S_2$, i.e. the source terminal of transistor $S_2$ and the drain terminal of transistor $S_1$, which are also connected to the first terminal of primary winding T1. The second terminal of capacitor $C_S$ is connected (e.g. directly) to the cathode of diode $D_1$, and the anode of diode $D_1$ is connected (e.g. directly) to terminal 102a. Moreover, an inductor $L_S$ and a second diode $D_2$ are connected (e.g. directly) between the anode of diode $D_1$ (i.e. the second terminal of capacitor $C_S$) and the second terminal of primary winding T1, which in turn is connected (as was previously the case) via one or more capacitors $C_{RP}$ to the first input terminal 102a and/or to the second input terminal 102b. Specifically, the cathode of diode $D_2$ is directed towards the anode of diode $D_1$ (i.e. the second terminal of capacitor $C_S$) and the anode of diode $D_2$ is directed towards the second terminal of primary winding T1. For example, in the presently considered embodiment, a first terminal of inductor $L_S$ is connected (e.g. directly) to the anode of diode $D_1$ (i.e. the second terminal of capacitor $C_S$), a second terminal of inductor $L_S$ is connected (e.g. directly) to the cathode of diode $D_2$ and the anode of diode $D_2$ is connected (e.g. directly) to the second terminal of primary winding T1.

Of course, without prejudice to the principle of the invention, the implementation details and the embodiments may vary, even appreciably, with respect to what has been described herein by way of non-limiting example only, without departing from the scope of the invention as defined by the annexed claims. For example, the snubber circuit 30 described in the foregoing may also be used in other asymmetric electronic half-bridge converters, which make use of the magnetizing current in order to create the ZVS condition.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

| LIST OF REFERENCE SIGNS | |
|---|---|
| Electronic converter | 10 |
| Input terminal | 102 |
| Output terminal | 104 |
| Control circuit | 112 |
| Lighting module | 20 |
| Input terminal | 200 |
| Snubber circuit | 30 |
| Capacitor | $C_o$ |
| Parasitic capacitance | $C_{A1}$ |
| Parasitic capacitance | $C_{A2}$ |
| Capacitor | $C_{RP}$ |
| Capacitor | $C_{RS}$ |
| Capacitor | $C_S$ |
| Diode | D |
| Diode | $D_1$ |
| Diode | $D_2$ |
| Body diode | $D_{A1}$ |
| Body diode | $D_{A2}$ |
| Diode | $D_S$ |
| Ground | $GND_1$ |
| Ground | $GND_2$ |
| Current flowing through capacitor $C_S$ | $I_{CS}$ |
| Current flowing through inductor $L_S$ | $I_{LS}$ |
| Output current | $i_{out}$ |
| Current flowing through primary winding T1 | $I_P$ |
| Magnetization inductance of transformer T | $L_M$ |
| Inductor | $L_o$ |
| Leakage inductance of transformer T | $L_R$ |
| Resistor | $R_S$ |
| Transistor | $S_1$ |
| Transistor | $S_2$ |
| Transformer | T |
| Primary winding | T1 |
| Secondary winding | T2 |
| Voltage across diode $D_1$ | $V_{D1}$ |
| Drain-source voltage of transistor $S_2$ | $V_{ds2}$ |
| Gate-source voltage of transistor $S_1$ | $V_{gs1}$ |
| Gate-source voltage of transistor $S_2$ | $V_{gs2}$ |
| Input voltage | $V_{in}$ |
| Output voltage | $V_{out}$ |

What is claimed is:

1. An asymmetric electronic half-bridge converter comprising: a positive input terminal and a negative input terminal for receiving a DC voltage;
   two output terminals for providing a regulated output voltage or a regulated output current;
   a half-bridge comprising a first and a second electronic switch connected in series between the two input terminals, wherein a respective capacitance and a respective diode are associated with the first and the second electronic switch;
   a first capacitor;
   a transformer comprising a primary winding and a secondary winding, wherein a first terminal of the primary winding is connected to the intermediate point between the first and the second electronic switch, and a second terminal of the primary winding is connected via the first capacitor to the positive input terminal or the negative input terminal;
   a rectification and filter circuit connected between the secondary winding and the output terminals; and
   a control unit configured to drive the first and the second electronic switch;
   wherein the electronic converter comprises a snubber circuit comprising a second capacitor, an inductor and a first and a second diode,
   wherein the first terminal of the second capacitor is connected to the first terminal of the primary winding, the second terminal of the second capacitor is connected to the cathode of the first diode and the anode of the first diode is connected to the negative input terminal, wherein the inductor and the second diode are connected in series between the cathode of the first diode and the second terminal of the primary winding, wherein the cathode of the second diode is directed towards the second terminal of the primary winding, or the first terminal of the second capacitor is connected to the first terminal of the primary winding, the second terminal of the second capacitor is connected to the anode of the first diode and the cathode of the first diode is connected to the positive input terminal, wherein the inductor and the second diode are connected in series between the anode of the first diode and the second terminal of the primary winding, wherein the anode of the second diode is directed towards the second terminal of the primary winding.

2. The electronic converter according to claim 1, wherein the capacitance of the second capacitor is from 1 pF to 10 nF.

3. The electronic converter according to claim 1, wherein the inductance of the inductor is from 200 uH to 10 mH.

4. The electronic converter according claim 1, wherein the inductance of the inductor is at least the double of the magnetization inductance of the transformer.

5. The electronic converter according to claim 1, wherein the rectification and filter circuit comprises:
   a diode,
   a third capacitor, wherein the third capacitor and the secondary winding are connected in series between the cathode and the anode of the diode; and
   an inductor, wherein the inductor and the two output terminals are connected in series between the cathode and the anode of the diode.

6. The electronic converter according to claim 5, wherein the rectification and filter circuit comprises a capacitor connected between the two output terminals.

7. The electronic converter according to claim 1, wherein the control unit is configured to drive the first and the second electronic switch with the following time intervals which are repeated periodically:
   a first time interval, wherein the first switch is closed and the second switch is opened,
   a following second time interval, wherein the first switch is opened and the second switch is opened,
   a following third time interval, wherein the first switch is opened and the second switch is closed, and
   a following fourth time interval, wherein the first switch is opened and the second switch is opened.

8. The electronic converter according to claim 1, wherein the control unit is configured to:
   detect the current provided via the two output terminals; and
   drive the first and/or the second electronic switch as a function of the detected current.

9. The electronic converter according to claim 1, wherein the first and the second electronic switch are field effect transistors.

10. The electronic converter according to claim 1, wherein at least one LED is connected between the two output terminals.

11. A method of operating an asymmetric electronic half-bridge converter, the asymmetric electronic half-bridge converter comprising:
   a positive input terminal and a negative input terminal for receiving a DC voltage;
   two output terminals for providing a regulated output voltage or a regulated output current;
   a half-bridge comprising a first and a second electronic switch connected in series between the two input terminals, wherein a respective capacitance and a respective diode are associated with the first and the second electronic switch;
   a first capacitor;
   a transformer comprising a primary winding and a secondary winding, wherein a first terminal of the primary winding is connected to the intermediate point between the first and the second electronic switch, and a second terminal of the primary winding is connected via the first capacitor to the positive input terminal or the negative input terminal;
   a rectification and filter circuit connected between the secondary winding and the output terminals; and
   a control unit configured to drive the first and the second electronic switch;
   wherein the electronic converter comprises a snubber circuit comprising a second capacitor, an inductor and a first and a second diode, wherein:
   the first terminal of the second capacitor is connected to the first terminal of the primary winding, the second terminal of the second capacitor is connected to the cathode of the first diode and the anode of the first diode is connected to the negative input terminal, wherein the inductor and the second diode are connected in series between the cathode of the first diode and the second terminal of the primary winding, wherein the cathode of the second diode is directed towards the second terminal of the primary winding, or the first terminal of the second capacitor is connected to the first terminal of the primary winding, the second terminal of the second capacitor is connected to the anode of the first diode and the cathode of the first diode is connected to the positive input terminal, wherein the inductor and the second diode are connected in series between the anode of the first diode and the second terminal of the primary winding, wherein the anode of the second diode is directed towards the second terminal of the primary winding;

the method comprising driving the first and the second electronic switch with the following time intervals which are repeated periodically:

a first time interval, wherein the first switch is closed and the second switch is opened, a following second time interval, wherein the first switch is opened and the second switch is opened, a following third time interval, wherein the first switch is opened and the second switch is closed, and a following fourth time interval, wherein the first switch is opened and the second switch is opened.

* * * * *